United States Patent [19]
Ebener

[11] Patent Number: 5,321,903
[45] Date of Patent: Jun. 21, 1994

[54] DEVICE FOR SIGNALING AN INCREASE IN FISHLINE TENSION

[76] Inventor: Warren R. Ebener, 1616 Terrace View Dr., West Columbia, S.C. 29169

[21] Appl. No.: 54,546
[22] Filed: Apr. 27, 1993
[51] Int. Cl.⁵ .............................................. A01K 85/01
[52] U.S. Cl. ............................................. 43/17; 43/25
[58] Field of Search ......................... 43/17, 16, 25, 17.5

[56] References Cited

U.S. PATENT DOCUMENTS

| | | | |
|---|---|---|---|
| 2,741,055 | 4/1956 | Weber, Jr. | 43/17 |
| 2,986,835 | 6/1961 | Ordinetz | 43/17 |
| 3,134,187 | 5/1964 | Blakely | 43/17 |
| 3,250,036 | 5/1966 | Wenger | 43/17 |
| 4,266,217 | 5/1981 | Kao et al. | 340/573 |
| 4,376,349 | 3/1983 | Yarczower | 43/17 |
| 4,384,425 | 5/1983 | Lemons, Sr. | 43/17 |
| 4,458,437 | 7/1984 | Ou | 43/17 |
| 4,471,554 | 9/1984 | Heiskell | 43/17 |
| 4,510,709 | 4/1985 | Melcher | 43/17 |
| 4,586,284 | 5/1986 | Westwood, III | 43/17 |
| 4,766,688 | 8/1988 | Hiles | 43/17 |
| 5,129,174 | 7/1992 | Wilson | 43/17 |

FOREIGN PATENT DOCUMENTS

| | | | |
|---|---|---|---|
| 2470539 | 6/1981 | France | 43/17 |
| 1082360 | 3/1984 | U.S.S.R. | 43/17 |

Primary Examiner—P. Austin Bradley
Assistant Examiner—James Miner
Attorney, Agent, or Firm—Michael A. Mann

[57] ABSTRACT

A compact signaling device mounted on a fishing pole for visually alerting a fisherman when a fish strikes the fishing line. The device comprises an electrical circuit including an LED, a battery, a switch for opening and closing the electrical circuit and a normally-closed pivoting arm that mechanically opens the switch when a portion of fishline is placed under the pivoting arm. When tension on the fishline increases sufficiently to remove it from under the pivoting arm, such as when a fish strikes the fishing line, the pivoting arm moves to close the switch thus illuminating the LED and alerting the fisherman. Also, the device has a rack and pinion gear or, alternatively, a threaded thumb screw for adjusting the pivoting arm so that the tension required to remove fishline from the pivoting arm can be varied in preselected increments.

13 Claims, 2 Drawing Sheets

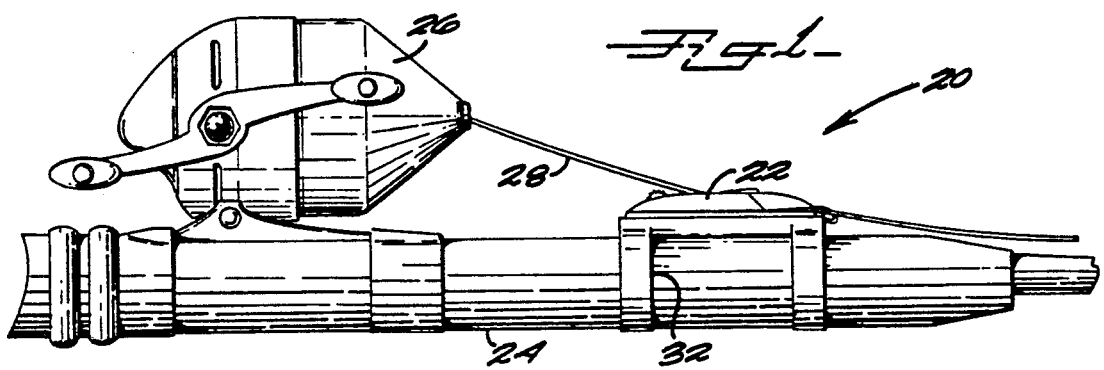
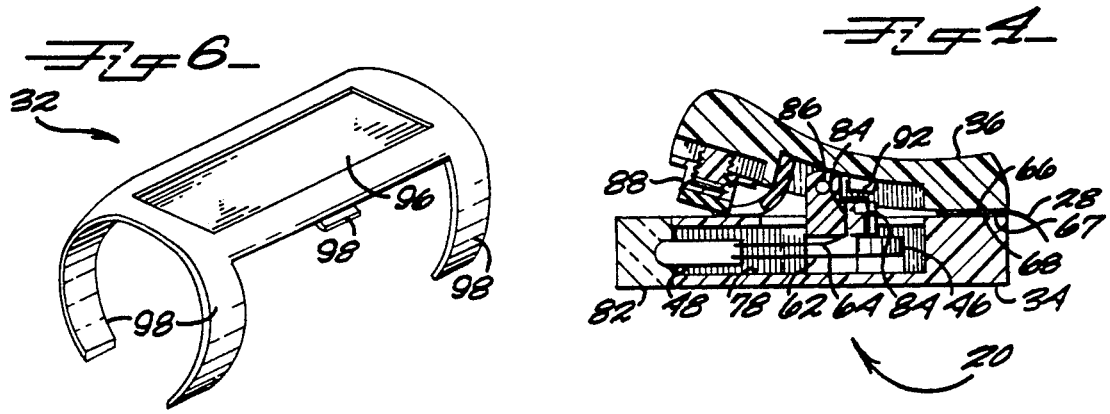
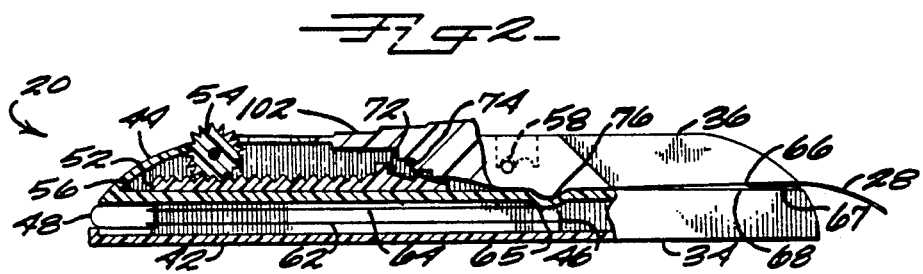
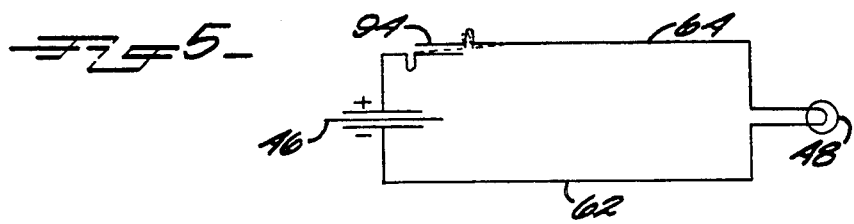

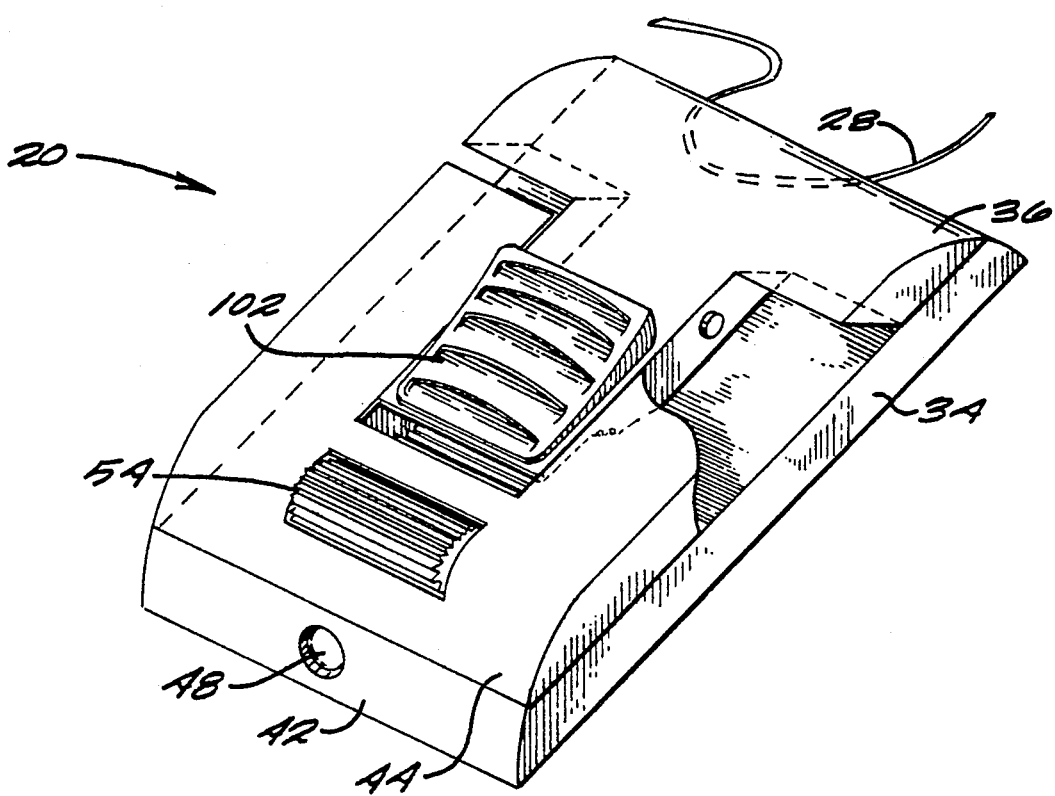

DEVICE FOR SIGNALING AN INCREASE IN FISHLINE TENSION

BACKGROUND OF THE INVENTION

1. Field of the Invention

The present invention relates to fishing. More particularly, the present invention relates to a device for visually signaling that a fish has taken the bait on a fishing line because of an increase in tension on the fishline.

2. Discussion of Background

Various devices have been developed for alerting fisherman when a fish has struck a fishline and has been hooked. A well-known device consists of a float attached to the fishing line just above the hook. When a fish attacks the hook, the float bobs in the water, notifying the fisherman that a fish has been hooked.

Obviously, the magnitude of the float's bob in the water indicates to the fisherman the type of strike by the fish, allowing the fisherman to act accordingly. That is, when a fish is simply nibbling, the float reacts with minor movements. For more aggressive attacks on the baited hook, the float might actually disappear briefly.

However, floats of this kind are often difficult to see when fishing at night. Also, the floats do not work well when the water surface is disturbed by wind, for example. Therefore, other signaling devices, both visual and audible, have been developed and disclosed.

For example, U.S. Pat. No. 4,766,688, issued to Hiles, discloses a strike indicating device that mounts directly on the fishing rod. The device has a motion-responsive electrical switch, such as a mercury level switch, fixed at an angle so that the fishing rod can be used in a holder having a 45° angle. Motion caused by a fish striking the line activates the switch, which operates a buzzer and/or a lamp to alert the fisherman.

U.S. Pat. No. 4,510,709, issued to Melcher, discloses a fishing rod holder with a bite signaling means. The holder is configured so that the fishing rod mounts in a yoke that is flexibly positioned just above a button for activating an electrical warning circuit. When a fish strikes the line, pressure on the line pulls the fishing rod and yoke down onto the activating button.

Several other signaling devices have been disclosed that use a change in the fishing line to alert the fisherman of a strike on the line. For example, Blakely, in U.S. Pat. No. 3,134,187, and Yarczower, in U.S. Pat. No. 4,376,349, use signaling devices activated by levers connected to the fishing line. Blakely's device mounts near the fishing pole so that the fishing line is fed through a U-shaped bail and wrapped around a triggering lever. Yarczower's device is configured similarly but it mounts directly onto the fishing pole near the end. In both devices, movement of the fishing line caused by the strike of a fish pulls the lever, thus activating a visual or audible signal to alert to the fisherman.

U.S. Pat. No. 4,384,425, issued to Lemons, Sr., discloses a device mounted directly onto the fishing rod, just past the reel, that provides both a visual and audible signal when a fish strikes the line. The device has a member that frictionally grips the line and moves to press an activating button when the line is pulled taut, for example, by the strike of a fish.

Both Kao et al (U.S. Pat. No. 4,266,217) and Ou (U.S. Pat. No. 4,458,437) disclose signaling devices using movement of the fishing line to close a pair of electrical contacts to activate a signaling circuit. Both devices mount directly onto the fishing rod and move a slidable contact into a stationary contact to activate the alerting signal, which is a lamp and/or buzzer.

Heiskell, in U.S. Pat. No. 4,471,554, discloses a device that also mounts onto a fishing pole and illuminates a battery-operated, double-faced head lamp when a portion of the fishing line, which is received between a pair of normally-closed contact arms, is dislodged from between the pair of contact arms. The device features a large spool for directing the fishing line through the pair of electrical contacts.

As is apparent from the foregoing, many signaling devices for detecting fish strikes are known in the prior art. However, as a practical matter, most signaling devices do not work effectively for one reason or another. Many of the known devices are bulky or complex, or require many moving parts to be effective. Moreover, it is believed that none of the signaling devices can be adjusted easily for use with different kinds of fish or for use in different fishing conditions.

There is a need for a simple, compact, and rugged signaling device that effectively alerts the fisherman of a fish strike.

SUMMARY OF THE INVENTION

According to its major aspects and broadly stated, the present invention is a device for signaling a fisherman that there has been an increase in tension on the fishline. In particular, it is a compact device mounted on a fishing pole that visually alerts a fisherman of a fish strike on the fishing line. The device comprises an electrical circuit having a light-emitting diode (LED) powered by a small battery, a small switch for opening and closing the electrical circuit and a normally-closed pivoting arm that mechanically opens the switch when a portion of fishing line is clamped by the pivoting arm. When sufficient tension is applied to the fishing line to remove it from under the pivoting arm, such as when a fish strikes the fishing line, the pivoting arm moves to close the switch, thus illuminating the LED and alerting the fisherman. Also, the device has means for adjusting the tension of the pivoting arm, such as preferably a rack and pinion or, alternatively, a threaded thumb screw.

The adjustability of the pivoting arm is an important feature of the present device. Because it is adjustable, the device can be used for catching different types of fish, and with different fishline and different fishing conditions. Preferably, the device's pivoting arm has a predetermined tension and the means for adjusting the tension of the pivoting arm adjusts the tension in calibrated increments to allow for the different conditions.

Another feature of the present invention is the use of an LED as the visual signal for alerting the fisherman. An LED emits light that can be easily seen at night, yet is limited to the minimum that the fisherman needs and will not shine on the water so that it might be seen by the fish. Also, an LED uses less power than most other illuminating devices, substantially prolonging the useful life of the battery.

Still another feature is the compact, light-weight design of the signaling device. It is easily mounted on a fishline without undue bulk or weight and can be positioned just forward of the reel near the first eyelet.

Yet another feature is the simplicity of the components contained within a rugged, watertight housing. Also, the watertight housing protects any delicate components from water damage, further protecting the operability of the device.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a signaling device for night fishing according to a preferred embodiment of the present invention;

FIG. 2 is a partial cross-sectional view of the device of FIG. 1 according to the preferred embodiment;

FIG. 3 is a perspective view of the device of FIG. 1 according to the preferred embodiment;

FIG. 4 is a partial cross-sectional view of the device of FIG. 1 according to an alternative embodiment;

FIG. 5 is a schematic view of the electrical circuit contained in the signaling device of FIG. 1; and FIG. 6 is a perspective view of a mounting device for securing the signaling device to a fishing rod.

DETAILED DESCRIPTION OF A PREFERRED EMBODIMENT

In the following description, similar components are referred to by the same reference numeral in order to simplify the understanding of the sequential aspect of the drawings.

Referring now to FIG. 1, the signaling device 20 in its preferred embodiment includes a compact housing 22 adapted for mounting on a fishing rod 24. Preferably, fishing rod 24 has a reel 26 for winding and unwinding a fishline 28 and a plurality of eyelets (not shown) for directing fishline 28 along fishing rod 24 as fishline 28 exits reel 26.

Device 20 is preferably mounted on fishing rod 24 near reel 26, and preferably mounted on top of fishing rod 24 between reel 26 and the first of the plurality of eyelets. A mounting clip 32 adapted to secure device 20 to fishing rod 24 is also shown in FIG. 6 and discussed more fully below.

Referring to FIGS. 2-3, a more detailed view of device 20 in its preferred embodiment is shown. Device 20 generally comprises a main housing 34 and an arm 36. Main housing 34 is divided into a lower chamber 42 and an upper chamber 44. Lower chamber 42 houses a battery 46 (not shown in FIG. 3) and a light 48. Upper chamber 44 contains a pinion gear 54 rotatably mounted therein and a rack 52 (not shown in FIG. 3) slidably carried by a floor 56 (not shown in FIG. 3) of upper chamber 44. Also, upper chamber 44 has a pair of notches 58 (not shown in FIG. 3) for pivotally connecting arm 36 to upper chamber 44.

Referring to FIG. 2, light 48 is preferably mounted in lower chamber 42 at the end closest to reel 26 when device 20 is mounted on fishing rod 24 so that light 48 can best be seen in order to alert a fisherman. A first leg 62 of light 48 extends toward and is in electrical contact with one side of battery 46. A second leg 64 of light 48 extends toward and is disposed just above the other side of battery 46. Normally, second leg 64 is not in contact with the other side of battery 46, however, second leg 64 need only be moved a few thousandths of an inch toward battery 46 to make contact with battery 46 and thus cause light 48 to be illuminated.

A thin, flexible membrane 65, positioned just above battery 46 and second leg 64, encloses the interior of lower chamber 42 so that lower chamber 42 is watertight. However, membrane 65 is flexible enough to allow second leg 64 to be moved to contact battery 46 by the application of downward force on flexible membrane 65.

As previously stated, arm 36 is pivotally mounted on main housing 34 at one of notches 58. Preferably, arm 36 is pivotally biased so that a first face 66 of arm 36 is in contact with a second face 68 of main housing 34. Thus, first face 66 and second face 68 clamp or pinch fishline 28. By clamp or pinch, it is meant that fishline 28 is held between first and second faces 66, 68, in a releasable manner, that is, with sufficient force to prevent release of fishline 28 until the tension on it increases abruptly above a preselected threshold. That is, increases and decreases in tension on fishline 28 due to movements of the water are insufficient to release fishline 28 from between first and second faces 66, 68. However, the sudden, abrupt increase in tension caused by a fish taking the bait on fishline 28 is sufficient to release fishline 28 from between first and second faces 66, 68.

Second face 68 includes a pad 67 made of rubber or similar material for enhancing the ability of first and second faces 66, 68 to clamp fishline 28. Because of the compression characteristics of pad 67, first and second faces 66, 68 will preferably accommodate and correspondingly clamp fishline 28 being of any normal size fishline.

Rack 52 and pinion gear 54 are used in combination to vary the force exerted by first face 66 against second face 68. Pinion gear 54 is rotatably connected to upper chamber 44 and engages rack 52, which is slidably carried by floor 56 of upper chamber 44. Turning pinion gear 54 clockwise slides rack 52 away from arm 36. Conversely, turning pinion gear 54 counterclockwise cause rack 52 to slide toward arm 36.

Rack 52 has an elevated face 72 at one end that engages a graduated undersurface 74 of arm 36. The engagement between elevated face 72 and graduated undersurface 74 causes graduated undersurface 74 to raise or lower that end of arm 36, depending on the direction of movement of rack 52. Specifically, movement of rack 52 toward arm 36 causes elevated face 72 of rack 52 to raise graduated undersurface 74 of arm 36, thus increasing the force exerted by first face 66 on second face 68. Also, a spring clip (not shown) mounted on a portion of graduated undersurface 74 keeps first face 66 biased toward second face 68.

A node or extension 76 formed on the underside of arm 36 is disposed just above flexible membrane 65 and second leg 64 of light 48 when first face 66 and second face 68 have fishline 28 therebetween. When fishline 28 is removed from between first face 66 and second face 68, or when first face 66 and second face 68 otherwise move toward and contact each other, extension 76 moves membrane 65 to cause second leg 64 to contact battery 46.

Alternatively, a pair of contacts (not shown) in electrical connection with battery 46 and light 48 could be mounted directly under extension 76. Thus, movement of extension 76 as described above will close the contacts and consequently illuminate light 48. In either configuration, extension 76 will have to be positioned so that movement of first face 66 in the range of a few thousandths of an inch will cause illumination of light 48.

Referring to FIG. 4, a detailed view of device 20, according to an alternative embodiment, is shown. In this embodiment, main housing 34 has a cavity 78 for housing light 48 and battery 46. A means for dispersing light 82 may be attached to the end of main housing 34 where light 48 is mounted. Also, main housing 34 has a pair of contacts 84 in electrical connection with light 48 and battery 46.

Arm 36 is pivotally connected to main housing 34 via a hinge 86 and functions similar to arm 36 in the preferred embodiment (as shown in FIGS. 2-3). When pivotally connected to main housing 34, arm 36 is oriented so that a first face 66 is in contact with a second face 68 of main housing 34, similar to first and second faces 66, 68 in FIGS. 2-3.

Referring again to FIG. 4, a thumb screw 88 is threadably attached to the other end of arm 36 to bias first face 66 toward second face 68. With this bias and the presence of pad 67, first face 66 and second face 68 form a clamp suitable for holding fishing line 28 therebetween.

Similar to the combination of rack 52 and pinion gear 54 in the preferred embodiment of device 20 (as shown in FIGS. 2-3), thumb screw 88 is used in the alternative embodiment (as shown in FIG. 4) to increase or decrease the spacing between one end of arm 36 with respect to main housing 34, thus increasing or decreasing the force applied by first face 66 against second face 68. Without thumb screw 88, first face 66 still applies a predetermined tension toward second face 68. Thumb screw 88 provides incremental, calibrated increases in the tension applied by first face 66 toward second face 68.

Also, arm 36 has a node or extension 92 formed on the underside of arm 36 for moving contacts 84 together in response to movement of first face 66 toward second face 68 until first face 66 comes in contact with second face 68. As with extension 76 in the preferred embodiment (shown in FIGS. 2-3), extension 92 must be positioned with respect to contacts 84 so that when first face 66 moves a few thousandths of an inch toward second face 68 and touches second face 68, extension 92 moves to close contacts 84.

In the preferred and alternative embodiments of device 20, light 48 can be any suitable illuminating means, such as a small incandescent lamp or the like, but is preferably a light emitting diode, and more preferably a Super Bright LED with 2000 MCD light output. Such an LED is rated at 1.85 volts and 20 milliamperes. LEDs are most preferred because they require less electrical power to operate and therefore extend the life of the battery being used.

Battery 46 can be any suitable battery, such as a small battery normally used in watches or calculators, but is preferably a 1.5 volt silver oxide 386 watch/calculator battery. A 386 watch/calculator battery is preferred because of its relative longevity for its size and when used in combination with the Super Bright LED. The 386 watch/calculator battery is also convenient for the preferred dimensions of main housing 34 in the preferred embodiment and main housing 34 in the alternative embodiment.

Preferably, main housing 34 and arm 36 in the preferred embodiment (FIGS. 2-3), and main housing 34 and arm 36 in the alternative embodiment (FIG. 4) are made of hard rubber, plastic, or any rugged, non-conductive material that is also waterproof.

The electrical configuration of device 20 is detailed schematically in FIG. 5. The simple circuit features battery 46 and light 48 connected in series. A switch 94, representing extensions 76, 92 and contacts 84, is connected in series between battery 46 and light 48 in order to control the illumination of light 48 by connecting (when switch 94 is closed) or disconnecting (when switch 94 is open) battery 46 from light 48. As previously discussed, the opening and closing of switch 94 is dictated by the movement of arm 36, as shown in FIGS. 2-3 (or arm 36 in the alternative embodiment shown in FIG. 4).

FIG. 6 shows a perspective view of mounting clip 32, which is used to secure device 20 to fishing rod 24. Mounting clip 32 has a top face 96 for receiving device 20. Top face 96 can be supplied with an adhesive for securing device 20 to top face 96 or, alternatively, top face 96 can be slightly recessed within mounting clip 32 and dimensioned so that device 20 fits snugly in mounting clip 32.

Mounting clip 32 has a plurality of curved legs 98 for wrapping around fishing rod 24 (shown in FIG. 1). Legs can be flexibly attached to top face 96 or, alternatively, made of a flexible and resilient material, such as plastic, rubber and the like so that mounting clip 32 can be attached to fishing rod 24 by bending legs 98 outward, positioning mounting clip 32 adjacent to fishing rod 24 and allowing legs 98 to return to their natural shape thereby wrapping around fishing rod 24.

Alternatively, mounting clip 32 can be made of a rigid material, such as metal or hard plastic. Thus, since most fishing rods are larger in diameter at the bottom than at the top, mounting clip 32 can be attached to fishing rod 24 by positioning legs 98 around fishing rod 24 near the top and then sliding mounting clip 32 down onto the increasingly larger portion of fishing rod 24, that is, near reel 26.

In use, and referring to the preferred embodiment of device 20 as shown in FIGS. 2-3, device 20 is attached by suitable means to mounting clip 32 and affixed to fishing pole 24 near reel 26. Pinion gear 54 is then rotated to adjust incrementally the force exerted by first face 66 on second face 68, as described hereinabove. The amount of force exerted by first face 66 on second face 68 dictates the amount of tension that must be applied to fishline 28 to remove it from between first face 66 and second face 68. Thus, device 20 can be adjusted for different fishing conditions, that is, different kinds of fish, different waters to be fished, different fishline, different fishing rods, devices and the like.

Once device 20 is mounted and adjusted for the particular fishing conditions, thumb pad 102 is used to move arm 36 along notches 58 until extension 76 is aligned with battery 46, as shown in FIG. 2, thus turning device 20 "on". Light 48 should illuminate immediately.

Once fishing rod 24 has been cast, a small portion of fishline 28 is placed between first face 66 and second face 68, as shown in FIGS. 1-3. The thickness of fishline 28 separates first face 66 from second face 68 far enough to cause extension 76 to allow second leg 64 to rise off of battery 46, thus extinguishing light 48.

Upon a fish striking fishline 28, the abrupt increase in tension applied to fishline 28 causes the small portion of fishline 28 clamped between first face 66 and second face 68 to be released. As a result, first face 66 moves toward second face 68, which causes extension 76 to move second leg 64 of light 48 into battery 46. Thus, light 48 is illuminated to notify a fisherman that his line has received a strike.

It will be apparent to those skilled in the art that many changes and substitutions can be made to the preferred embodiment herein described without departing from the spirit and scope of the present invention as defined by the appended claims.

What is claimed is:

1. A device for detecting the application of tension on a fishline, said device comprising:
   means for releasably clamping a portion of said fishline, said portion of said fishline being removable from said clamping means when an amount of said tension is applied to said fishline, said clamping means having a first face and an opposing, spaced-apart second face and biased toward one another, said first face and said second face cooperating to clamp said portion of said fishline therebetween;
   means for signaling the application of said tension on said fishline;
   means in operative connection with said signaling means and with said clamping means for activating said signaling means in response to said portion of said fishline being removed from said clamping means; and
   a rack and pinion for adjusting said second face to increase the bias between said first and second faces toward one another so that said amount of said tension applied to said fishline must be increased in order to remove said portion of said fishline from said clamping means.

2. The device as recited in claim 1, wherein said signaling means is a light.

3. The device as recited in claim 1, wherein said signaling means is a light emitting diode.

4. The device as recited in claim 1, wherein said activating means further comprises:
   a battery; and
   a pair of electrical contacts, said contacts electrically connected in series with said battery and said signaling means so that said signaling means is activated when said contacts are closed and said signaling means is not activated when said contacts are open.

5. A signaling device for use with a fishing rod having a fishing line, said device detecting a sufficient amount of tension on said fishing line, said device comprising:
   means for releasably clamping a portion of said fishing line, said clamping means having a first face with an opposing first end and an opposing, spaced-apart second face with an opposing second end, said first and second faces pivotally connected and biased toward one another, said first face and said second face cooperating to clamp said portion of said line therebetween, said portion of said fishing line being removable from between said first and second faces in response to said sufficient amount of tension on said fishing line;
   a light for signaling the detection of said sufficient amount of tension on said fishing line;
   means in electrical connection with said light and in operable connection with said clamping means for activating said light in response to said portion of said fishing line being removed from said clamping means; and
   a rack and pinion for adjusting said second face of said clamping means to increase said sufficient amount of tension by moving said first and second ends away from one another so that the bias between said first and second faces toward one another is increased.

6. The device as recited in claim 5, further comprising a housing for carrying said light, said clamping means, said activating means and said adjusting means, said housing made of a waterproof material, said housing carried by said fishing rod.

7. The device as recited in claim 5, wherein said light is a light emitting diode.

8. The device as recited in claim 5, wherein said fishing rod has a reel for dispensing said fishing line therefrom and a plurality of eyelets for directing said fishing line along said fishing rod, said device further comprising:
   a housing for carrying said light, said clamping means, said activating means and said adjusting means; and
   a mounting plate dimensioned to receive said housing and adapted for mounting said housing on said fishing rod at a location between said reel and the first of said plurality of eyelets.

9. A signaling device for use with a fishing rod having a reel for winding and unwinding fishing line and a plurality of eyelet's for directing said fishing line along said fishing rod, said device comprising:
   a housing having a first end with a first face and a second end, said housing made of a waterproof material;
   an arm pivotally mounted on said housing, said arm having a third end with a second face and a fourth end, said arm oriented so that said first and second faces are opposing and biased toward one another to releasably grip a portion of said fishing line, said portion of said fishing line being removable from between said first and second faces when a sufficient amount of tension is applied to said fishing line;
   a light carried within said second end of said housing for signaling the detection of said sufficient amount of tension on said fishing line;
   means carried within said housing and in electrical connection with said light for activating said light in response to removal of said portion of said fishing line,
   said housing having a flexible membrane in operable connection between a portion of said arm and said activating means so that said housing is watertight and so that said light is activated by said portion of said arm operably engaging said activating means through said flexible membrane in response to removal of said portion of said fishing line; and
   means for adjusting said arm to move said first and second faces closer to increase said sufficient amount of tension.

10. The device as recited in claim 9, wherein said adjusting means further comprises a thumb screw threadably attached to said fourth end, said thumb screw moving said fourth end away from said second end to move said first and second faces closer so that said sufficient amount of tension is increased.

11. The device as recited in claim 9, wherein said adjusting means further comprises:
    a rack slidably carried by said second end of said housing; and
    a pinion rotatably connected to said second end and in rotatable connection with said rack whereby rotation of said pinion moves said rack laterally toward said first end of said housing, said rack increasing the distance between said fourth end and said second end when moving laterally toward said first end so that said first and second faces move closer and said sufficient amount of tension is increased.

12. The device as recited in claim 9, wherein said light is a light emitting diode.

13. The device as recited in claim 9, wherein said light is a Super Bright light emitting diode rated at approximately 1.85 volts and 20 milliamperes and wherein activating means further comprises:
   a 1.5 volt, silver oxide battery; and
   a pair of electrical contacts, said contacts electrically connected in series with said battery and said light so that said light is activated by closing said contacts, said contacts being open when said portion of said fishing line is between said first and second faces and said contacts being closed when said portion of said fishing line is removed from between said first and second faces.

* * * * *